Sept. 6, 1927.
C. G. STRANDLUND
WHEELED PLOW
Original Filed March 2, 1921    3 Sheets-Sheet 2
1,641,706
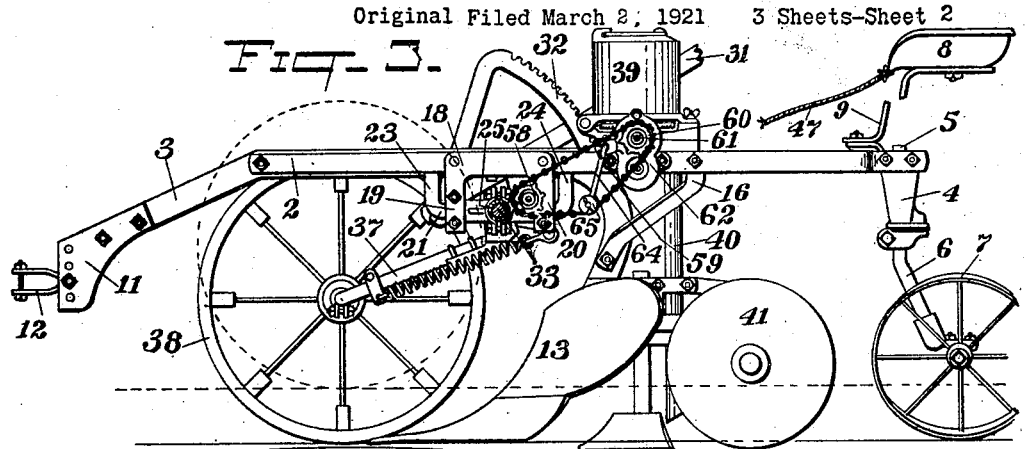
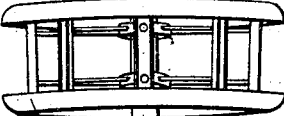
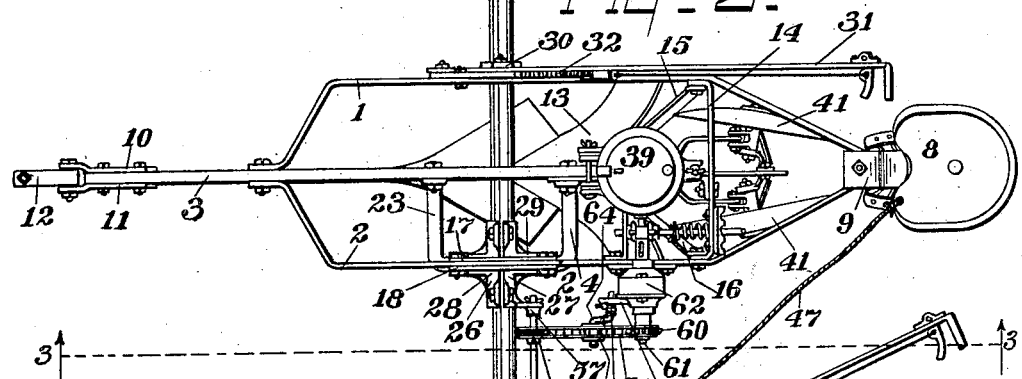
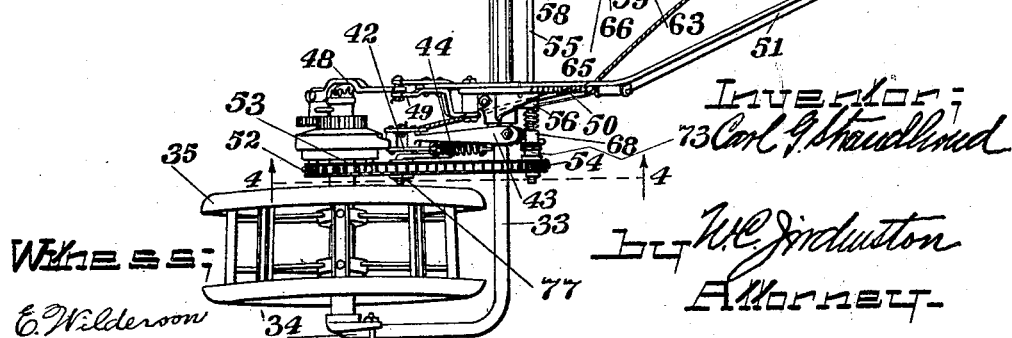

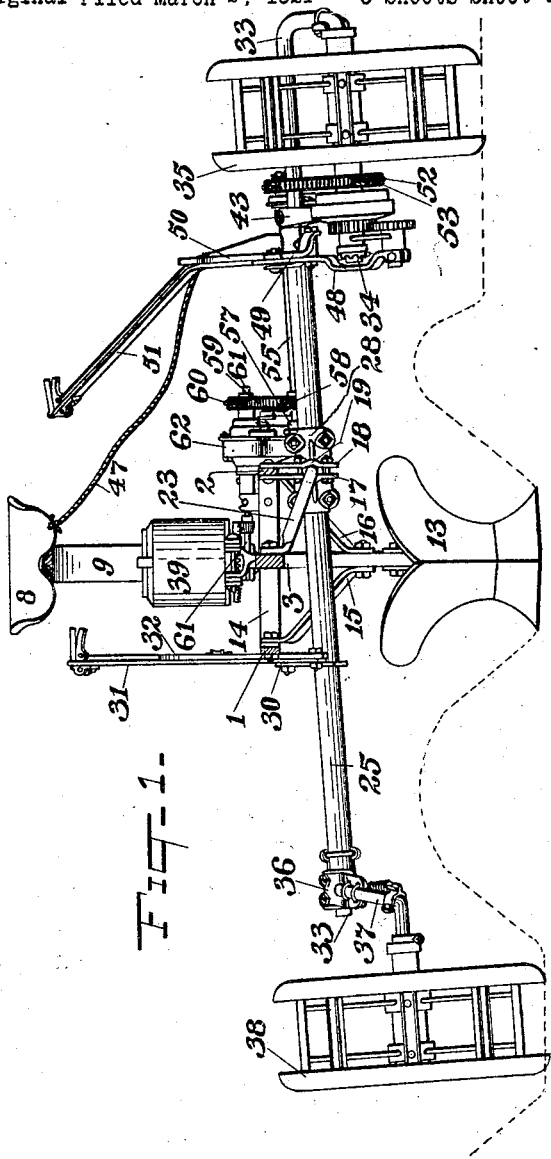

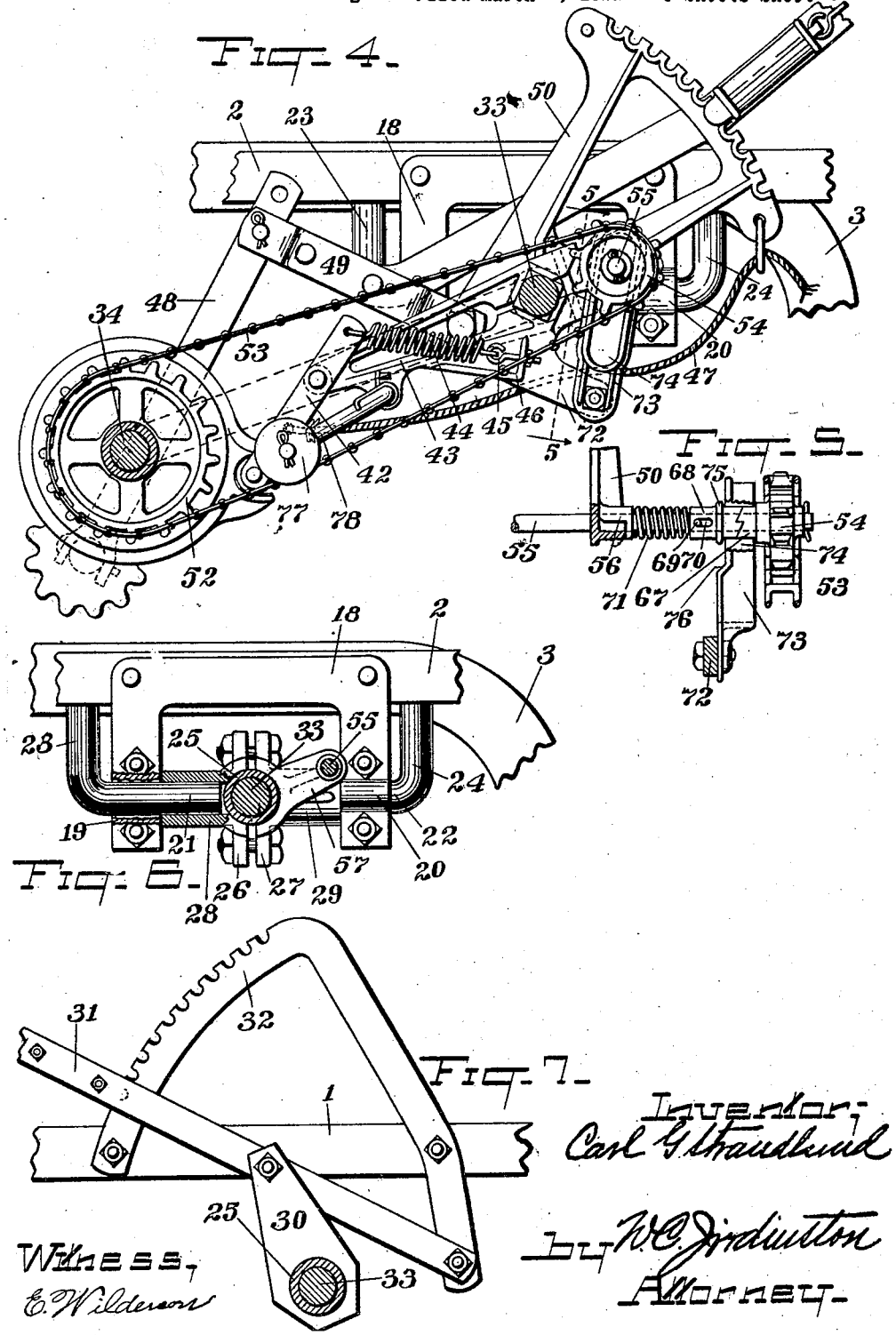

Patented Sept. 6, 1927.

1,641,706

UNITED STATES PATENT OFFICE.

CARL G. STRANDLUND, OF MOLINE, ILLINOIS, ASSIGNOR TO DEERE & COMPANY, OF MOLINE, ILLINOIS, A CORPORATION OF ILLINOIS.

WHEELED PLOW.

Application filed March 2, 1921, Serial No. 448,999. Renewed April 14, 1923.

My invention relates to wheeled plows of the power lift type, and has for its object to provide an improved construction applicable to plows and analogous implements having a main or plow body carrying frame and a wheel frame on which the main frame is mounted, by which leveling adjustment of the main frame does not affect the operation of the lifting mechanism.

Referring to the drawings, in which I have illustrated my invention as embodied in a combined lister plow and planter, Figure 1 is a front elevation, in part section, of my improved machine.

Figure 2 is a plan view.

Figure 3 is a longitudinal section on the line 3—3 of Figure 2.

Figure 4 is an enlarged detail section of part of the power transmitting mechanism taken on the line 4—4 of Figure 2.

Figure 5 is an enlarged detail taken on the line 5—5 of Figure 4.

Figure 6 is an enlarged detail, in part section, of the axle support, and

Figure 7 is an enlarged detail side view of the mechanism employed to rock the axle laterally.

The main or plow body carrying frame is composed of bars 1 and 2 bent to converge at their forward ends where they are rigidly connected to a plow beam 3. The rear ends of the bars 1 and 2 converge and are rigidly connected to a casting 4 in which is rotatably journaled a spindle 5, preferably integral with a crank axle 6 upon which are mounted wheels 7 of the usual type. A seat 8 is mounted on a seat spring 9 secured on the rear of the frame.

The forward end of the plow beam 3 carries a clevis comprising plates 10 and 11 bolted, respectively, to opposite sides of the plow beam and provided with suitable perforations for adjustment of the draft device 12 held between the plates. On the rear of the beam 3 is mounted a lister plow body 13 of a well known type.

To add to the rigidity of the structure a transverse bar 14 is bolted to the bars 1 and 2. A brace 15 extends from the frame bar 1 downwardly to the beam 3 and is bolted to both, a similar brace 16, secured in the same manner extends from the frame bar 2 to the plow beam 3.

Secured on opposite sides of the frame bar 2, respectively, are depending inverted U-shaped brackets 17 and 18 having bearings 19 and 20 formed between them for the reception of horizontal portions 21 and 22 of braces 23 and 24. The braces 23 and 24 are made from round bars and are rigidly secured to the plow beam 3 from which they extend downwardly to the brackets 17 and 18 and are bent to form the horizontal portions 21 and 22, the latter extending beyond their bearings and toward each other in alinement.

A tubular non-rotatable member 25 extending transversely beneath the frame, is rigidly clamped between opposite parts 26 and 27 of a split sleeve by suitable bolts, the part 26 having a bearing 28 to receive the end of the horizontal part 21 of the brace 23, and the part 27 having a bearing 29 to receive the end of the horizontal part 22 of the brace 24; the parts 21 and 22 forming a pivotal support, longitudinal of the frame, for the non-rotatable member and on which the latter rocks laterally with respect to the main frame in the operation of leveling said frame. The non-rotatable member 25 is also supported by a movable bracket 30 which is pivotally secured on a lever 31, intermediate the ends of and nearer the forward end of the latter; a notched sector 32 is mounted on the frame bar 1 and a radius of the sector is extended below the frame bar 1 to form a pivotal support for the lever 31. The lever 31 is provided with the usual grip for easy operation, and carries the ordinary type of dog to hold the lever, in any desired adjustment, by engaging with the notches in the sector 32. By this construction the level of the plow is maintained by operation of the lever 31 to rock the axle 33 laterally relatively to the plow frame.

Rockably mounted in the non-rotatable member 25 is an axle 33, having one end bent to form a crank with an inwardly extending spindle 34 on which is journaled a ground engaging supporting wheel 35. On the opposite end of the axle 33, which extends beyond the member 25, is rigidly secured a casting 36 carrying a crank axle 37 on which is journaled a ground engaging supporting wheel 38 having its axis in permanent alinement with the axis of the wheel 35. The non-rotatable member and the axle comprise a wheel frame on which the main frame is mounted. Both of the supporting wheels are of the skeleton type, but I do not limit myself in this respect, as other types may be employed for the same purpose.

Supported on the main frame is a well known type of planting mechanism including a seed container 39, a feed pipe 40, through which seed is delivered into the furrow made by the plow 13, and covering disks 41. Power to operate the seeding mechanism is supplied from the traction of the supporting wheel 35 which is also provided with means to utilize the power of the traction to raise the plow out of operation. The particular type of power lift shown is well known and includes a clutch, one member of which rotates constantly with the wheel 35, the second member of the clutch is held inactive by a tripping lever 42 pivotally mounted intermediate its ends on an arm 43 rigidly secured on the axle 33. A coiled spring 44 is connected to the upper end of the lever 42 and to an eye bolt 45, on a projection 46 extending from a side of the arm 43, its tension holding the opposite end of the lever in co-operation with a clutch member which is inactive until the lever is rocked on its pivot, to withdraw it from engagement with the clutch member, by a chain or cable 47 which is attached to the lever 42, below its pivot, and extends to the seat of the operator of the machine.

As described, I employ sun and planet gearing to utilize the traction of the wheel to lift the plow, and to the planet gear mounting is connected a link 48 which is pivotally attached, at its upper end, to a bar 49 extending rearwardly and pivoted to a notched sector 50 which is rigidly mounted on the tubular member 25. A hand lever 51 is bolted or riveted to the bar 49, and extends rearwardly to convenient reach of the operator of the machine, and is provided with the usual type of latch to engage with the notches in the sector 50. I do not limit myself to the particular means shown for employing the traction power of the landwheel to raise the machine, as other mechanism may be employed without departing from the spirit of my invention, but an important feature of my invention resides in transmitting the lifting power to the main frame through the non-rotatable member, as by that arrangement leveling adjustment of the main frame does not affect the operation of the lifting mechanism.

Rigidly secured to the clutch member, which rotates constantly with the wheel 35, is a sprocket 52 over which travels a chain 53 to a smaller sprocket 54 loosely mounted on a shaft 55. The shaft 55 is rotatably supported, parallel with the member 25, in bearings 56 and 57; the bearing 56 is preferably integral with the sector 50, and the bearing 57 is preferably integral with the part 27 of the split sleeve in which the member 25 is held. A sprocket 58 is mounted on the shaft 55, to rotate therewith, and over it travels a chain 59 to a sprocket 60 on a shaft 61, which drives the seeding mechanism. The shaft 61 is supported in a housing 62, bolted to the frame bar 2, and journaled in a bearing 63 on the housing 62 is a crank 64 carrying a roller 65, on its free end, which is held forcibly against the chain 59 by a coiled spring 66 on the crank, in a manner common in the art, to automatically take up any slack in the chain 59 which may be caused by lateral adjustment of the member 25, to level the plow, or by the wear of continued operation. The chain 59 constitutes a flexible connection from the sprocket 58 to the sprocket 60, and is thoroughly effective in operation irrespective of the adjustment to level the plow.

As previously stated the sprocket 52 rotates with the wheel 35 and through the chain 53 similar constant activity is imparted to the sprocket 53 transmitting the traction power of the wheel 35 to operate the seeding mechanism; when the plow is raised out of operation, however, the seeding mechanism is automatically disconnected from the power and ceases to act until the plow is again lowered and working. This automatic disconnection is accomplished in the following manner: The sprocket 54 is loosely mounted on the shaft 55 and integral with its hub is a part 67 of an ordinary claw clutch engageable with a second part 68 slidably mounted on the shaft 55 with which it is held to rotate by a pin 69 in the shaft 55 and extending into a longitudinal slot 70 in the part 68 of the clutch. The parts of the clutch are held in engagement by a coiled spring 71 on the shaft 55, compressed between the bearing 56, on the sector 50, and the part 68 of the clutch.

Extending rearwardly from the arm 43, and preferably integral therewith, is an arm 72 having its extremity pivotally connected to a member 73 in which is a slot 74; the clutch extends through the slot 74, and the part 68 thereof has a circumferential flange 75, the diameter of which is greater than the width of the slot. On the side of the member 73, toward the flange 75, is a cam shoulder 76, which operates against the flange 75 to separate the parts of the clutch as the plow is raised out of operation, for as the arm 43 is rigidly secured on the axle 33 it must rock therewith, consequently when the axle 33 is rocked to raise the plow the arm 72 will raise the member 73, the cam shoulders 76 operating against the flange 75 to separate the clutch parts 67 and 68; by this operation the power to actuate the seeding mechanism is cut off until, in lowering the plow, the parts 67 and 68 of the clutch are again engaged. A roller 77, journaled on a crank 78 supported on the arm 43, is yieldingly held against the chain 53 by a coiled spring 79, in a manner common in the art, to take up such slack as may occur.

What I claim is—

1. In a machine of the character described, the combination of a wheel frame, supporting wheels therefor adapted to be moved forwardly or rearwardly to raise or lower the frame, means to move said wheels, a main frame pivotally supported on the wheel frame at one side of the longitudinal medial line of the main frame, said pivotal support comprising bearings having an axis parallel with said medial line, means to rock the main frame laterally, and a plow carried by the main frame and swung laterally by the rocking thereof.

2. In a machine of the character described, the combination of a wheel frame, supporting wheels therefor adapted to be moved forwardly or rearwardly to raise or lower the frame, means to move said wheels, a main frame pivotally supported on the wheel frame at one side of the longitudinal medial line of the main frame, said pivotal support comprising bearings having an axis parallel with said medial line, means on the opposite side of said line connecting the wheel frame and the main frame and operable to rock the latter on said bearings, and a plow carried by the main frame and swung laterally by the rocking thereof.

3. In a machine of the character described, the combination of a main frame, a transversely disposed tubular member having a hinge connection with one side of the main frame, said hinge connection having the axis of its pivot longitudinally parallel with the main frame, an axle journaled to rock in the tubular member to raise or lower the main frame, supporting wheels on said axle, means to rock said axle, and means to rock said tubular member and main frame laterally with respect to each other.

4. In a machine of the character described, the combination of a main frame, a transversely disposed tubular member having a hinge connection with one side of the main frame, said hinge connection having the axis of its pivot longitudinally parallel with the main frame, an axle journaled to rock in the tubular member to raise or lower the main frame, supporting wheels on said axle, means to rock said axle, and means connecting the tubular member and the main frame on the side opposite the hinge connection and operable to rock said tubular member and main frame laterally with respect to each other.

5. In a machine of the character described, the combination of a main frame including a plow beam and side beams, a bracket support mounted on one of the side beams, braces secured to the plow beam and to the support, a tubular member extending transversely of the main frame and pivotally supported intermediate its ends on said bracket, an axle rockably journaled in said tubular member, supporting wheels on the axle, and means on the frame connected to said tubular member and operable to rock said frame and tubular member relatively to each other.

6. In a wheeled plow, the combination with a main frame, of a wheel frame comprising a member disposed transversely of said main frame and pivotally connected therewith to rock relatively thereto about an axis disposed longitudinally thereof, and a crank axle journaled on said member to rock fore and aft for raising or lowering said main frame, means for rocking the axle on said member to raise the main frame, wheels mounted on the end portions of said axle, and means for rocking said main frame laterally about the pivot of said member.

CARL G. STRANDLUND.